United States Patent [19]
Merrett

[11] Patent Number: 5,797,421
[45] Date of Patent: *Aug. 25, 1998

[54] DRY HYDRANT SIPHON ASSEMBLY

[75] Inventor: Stanley Leo Merrett, Dadeville, Ala.

[73] Assignee: Schlumberger Industries, Inc., Norcross, Ga.

[ * ] Notice: The term of this patent shall not extend beyond the expiration date of Pat. No. 5,509,437.

[21] Appl. No.: 473,908

[22] Filed: Jun. 7, 1995

Related U.S. Application Data

[63] Continuation-in-part of Ser. No. 180,406, Jan. 12, 1994, Pat. No. 5,509,437.

[51] Int. Cl.$^6$ ........................................ E03B 9/02
[52] U.S. Cl. ............... 137/236.1; 137/239; 137/512.15; 137/513.5; 417/80; 169/24; 169/51; 169/91
[58] Field of Search .................... 137/14, 15, 236.1, 137/239, 512.15, 513.5, 583, 590, 513.3; 417/80, 89, 79; 169/5, 13, 24, 51, 91

[56] References Cited

U.S. PATENT DOCUMENTS

| | | | |
|---|---|---|---|
| 106,433 | 8/1870 | Van Keuren | 137/512.15 |
| 857,519 | 6/1907 | Foster | 137/596 X |
| 901,733 | 10/1908 | O'Sullivan | 169/91 |
| 1,038,201 | 9/1912 | Rateau | 417/80 |
| 1,209,800 | 12/1916 | Barber | 137/236.1 |
| 1,613,165 | 1/1927 | Gordijn, Jr. | 417/79 |
| 2,056,994 | 10/1936 | Woods | 417/79 |
| 2,133,269 | 10/1938 | Berman et al. | 417/80 |
| 2,341,517 | 2/1944 | Wieland | 417/80 |
| 2,545,915 | 3/1951 | Bovee, Jr. et al. | 417/80 |
| 2,654,434 | 10/1953 | Culleton | 417/80 X |
| 2,674,189 | 4/1954 | Lung | 417/80 |
| 3,108,440 | 10/1963 | Anderson | 137/236.1 X |
| 3,180,423 | 4/1965 | Gibbs | 169/24 |
| 3,211,102 | 10/1965 | Keehan | 137/513.3 X |
| 3,457,863 | 7/1969 | Carter | 417/89 |
| 3,493,053 | 2/1970 | Triplett | 169/24 |
| 3,759,330 | 9/1973 | Rainey et al. | 169/13 X |
| 3,831,628 | 8/1974 | Kintner et al. | 137/512.15 |
| 4,319,452 | 3/1982 | Morita et al. | 137/512.15 X |
| 4,508,138 | 4/1985 | Dixon | 137/239 |
| 5,509,437 | 4/1996 | Merrett | 137/236.1 |

*Primary Examiner*—John Rivell
*Attorney, Agent, or Firm*—Leonard W. Pojunas

[57] ABSTRACT

A siphon jet is attached to a dry hydrant which is in communication with a body of water to increase the flow of fluid to the dry hydrant and assist in overcoming the effects of atmospheric pressure and gravity in drawing the water. A pressurized fluid source can add fluid to the siphon assembly and this forces water from the body up the hydrant pipe. Also, the fluid from the pressurized fluid source can be added forward of a valve to fill the hydrant pipe which thus minimizes the duration of priming operations.

25 Claims, 10 Drawing Sheets

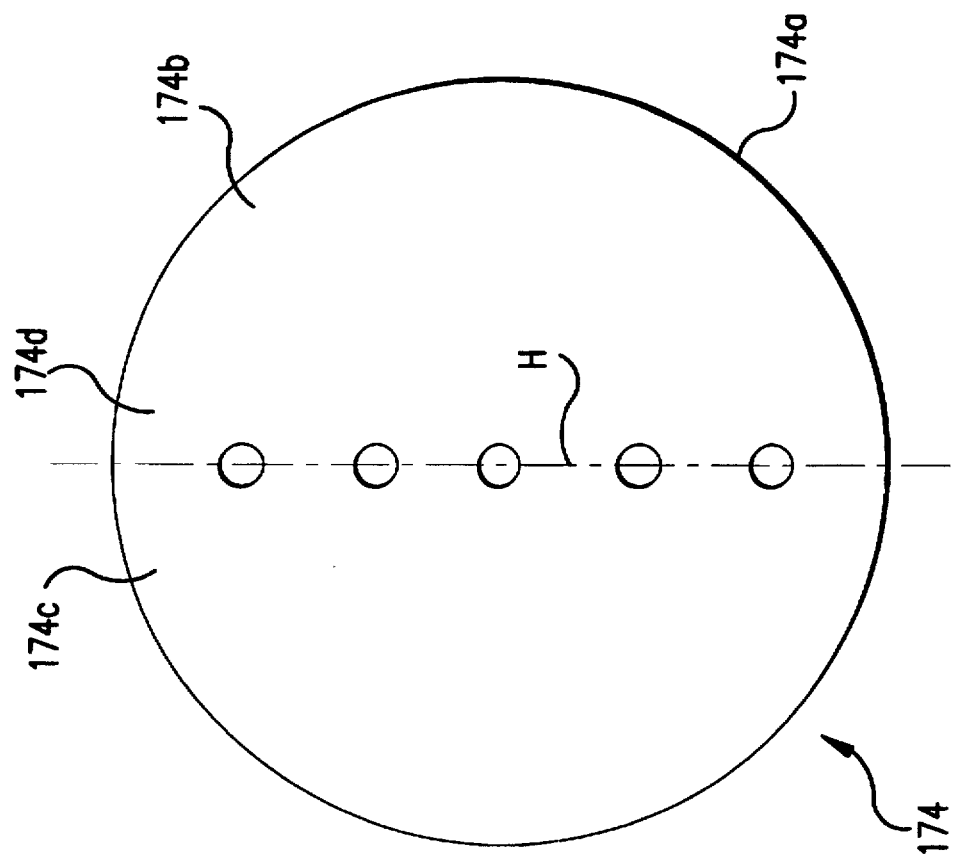

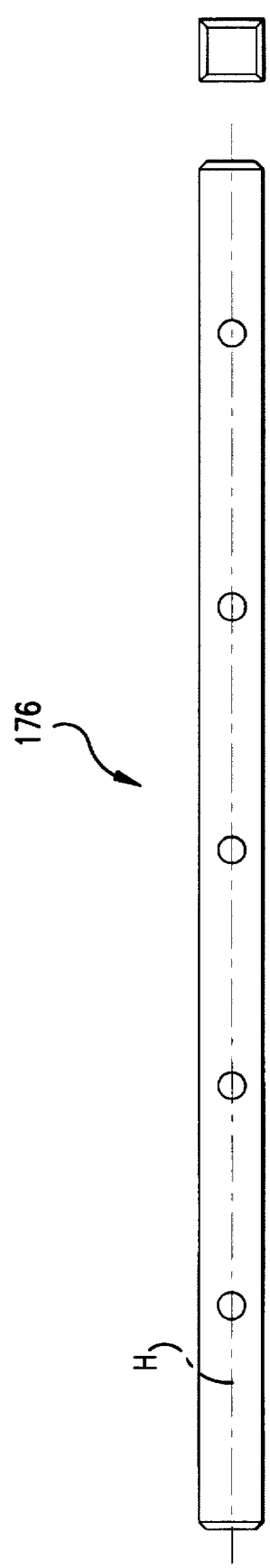

DRY HYDRANT SIPHON ASSEMBLY

CROSS-REFERENCE TO RELATED APPLICATION

This application is a continuation-in-part of application U.S. Ser. No. 08/180,406, filed Jan. 12, 1994 now U.S. Pat. No. 5,509,437.

BACKGROUND OF THE INVENTION

1. Field of the Invention

The present invention relates generally to fire hydrants and, more particularly, to a dry hydrant in which increased flow is desired or which may be suitable for use with bodies of water wherein the elevational differences between surface level of the water and suction point is greater than the lift ability of the pump.

2. Background Art

Dry hydrants are a type of fire service hydrant generally for use where no source of pressurized water exists. For example, in rural communities where there is no centralized water service, water for fire fighting is commonly drawn from lakes, ponds, cisterns or the like. Typically, a tanker truck will draw water from a nearby body of water using a flexible hose fitted with a special strainer to prevent debris from being drawn into the hose. The tanker will then travel to the site of the fire where a pumper truck draws water from the tanker to fight the fire.

Such an arrangement is inconvenient and may waste valuable time while the special strainer is being connected to the hose. The special strainer assembly must then be properly disposed within the body of water. If placed indiscriminately, the strainer may draw debris, leaves or mud which will clog the strainer and diminish the water flow to the tanker.

To avoid the foregoing problem, a dry hydrant is permanently installed and, as best depicted in FIG. 1A, comprises a length of pipe 10 having one end 12 (e.g., the submerged end) disposed below the water line 14 of the body of water 16, with the other end 18 (the unsubmerged end) exposed at or near the shoreline 20. In this arrangement, a length of polyvinyl chloride (PVC) pipe 10 is laid in a trench dug from the shoreline 20 to enable the submerged end 12 to be disposed at a predetermined fixed depth in the water 16. The horizontal extent 10a of the pipe 10 is connected via a 90° elbow 22 to a vertical standpipe 10b. The standpipe 10b is provided with a coupling 24a which enables a standard fire service hose to be connected to the standpipe to draw water through the dry hydrant pipe 10 to a tanker truck. A capped strainer 24b is connected to the submerged pipe end 12 and is maintained a predetermined distance from the bottom 26 with a support 28 anchored to the bottom but at a depth sufficient to provide water during drought conditions which may occur only once every fifty years (e.g., the fifty year drought level 30).

FIG. 1B is an illustration of a conventional shallow pond installation wherein the pond has a gradual sloped bottom 32 which generally prevents a backhoe from reaching out far enough into the pond to provide a trench at proper depth. In this type of situation, only draining of the pond or use of a drag line would allow for proper installation. In most cases, however, this is either not possible or is cost prohibitive. This type of installation is often characterized by excessive pipe lengths 10c and 10d relative to the pipe lengths 10a, 10d used in the standard installation of FIG. 1A.

FIG. 1C is an illustration of a dry hydrant installation in situations in which underground rock 34 prevents continued horizontal laying of pipe beneath the water surface. This installation also results in excessive dry pipe lengths 10e.

Since the dry hydrant 10 is a suction device, the fire department pump must be primed before flow can be established. This is usually accomplished by using a small electrical primer pump. Generally speaking, primer pumps should not be operated for longer than one minute since motor burnout is likely to occur. Inability to operate safely a primer pump prevents the larger centrifugal fire pump from running.

Atmospheric pressure affects the ability of priming pumps to operate without burnout. At sea level, atmospheric pressure is 14.7 psi, which is equivalent to a column of water 33.865 feet high. Water could be lifted from that height if pumps were "perfect"; however, vertical lift will be less because pump losses, such as friction loss and/or slippage, occur. Even less vertical lift is possible at higher elevations because atmospheric pressure is lower. For example, atmospheric pressure is 12.20 psi at 5,000 feet and only 10.05 psi at 10,000 feet. Since many areas have high elevations (e.g., Denver exceeds one mile), lift capacity of pumps may be even more limited at numerous geographical locations.

The Insurance Service Office ("ISO") is the regulatory agency which evaluates Fire Departments in establishing their ability to extinguish a fire. For ISO purposes, the current limitation for lift is 15 feet at sea level and less at higher elevations. This results in the disqualification of many otherwise "usable" water sources. Since forty (40%) percent of an insurance evaluation is based on water supply, homes in rural settings are often times penalized by the lack of water. This creates a negative economic impact for these communities because getting a favorable ISO evaluation can lead to drastically reduced home insurance rates.

These ISO limits, however, consider equipment limitations existing prior to this invention. There was no equipment available for fire department pumper trucks to draft large flows beyond the confines of atmospheric pressure. Although there are specially designed vacuum tank trucks which can lift water and other liquids such as septic tank sewage from depths greater than fire department pumper trucks, they are not effective for fire suppression. These vacuum tank trucks cannot draft and pump at the same time. They also require high pressure tank walls with special high velocity vacuum pumps which creates negative pressure inside the tank.

SUMMARY OF THE INVENTION

The above disadvantages of the prior art are overcome by the present invention which provides a dry hydrant comprising a hydrant pipe having a jet siphon system, which can be a permanently installed to the submerged end of the pipe. The jet siphon allows drafting of water—often for fighting fires—from elevations exceeding lifts normally impossible if just relying on atmospheric pressure.

Specifically, in one embodiment of the present invention, the dry hydrant comprises a hydrant pipe having a submerged end located within the body of water and an unsubmerged end located elevationally above the body of water, a siphon assembly, and a pressurized fluid source. The siphon assembly comprises a housing defining therein an inner chamber having a first end in fluid communication with the submerged end of the hydrant pipe and an opposite second end in fluid communication with the body of water, a nozzle jet mounted within the inner chamber. An upstream end is adjacent the first end of the housing with the housing having an opposite downstream end, and a venturi tube having a first venturi end located within the inner chamber intermediate the second end of the inner chamber and the downstream end of the nozzle jet, a second venturi end disposed outside the housing, and a conduit connecting the first venturi end and the second venturi end and allowing fluid communication therebetween. The pressurized fluid source is in communication with the venturi tube of the siphon assembly wherein the pressurized fluid enters the second venturi end of the venturi tube, exits the first venturi end, and then enters the downstream end of the nozzle jet.

In conjunction with the fluid source, the siphon assembly forces water in a first direction through the hydrant pipe and out of the unsubmerged end and impedes the flow of water through the hydrant pipe in an opposite second direction. Specifically, fluid from the pressurized fluid source exits the first venturi end at a high velocity and then enters the nozzle jet. This fluid also can entrain water from the body of water. The combination of these two fluids travels through the nozzle jet and upon exiting the nozzle jet, the pressure of the combination of the fluids has increased. Therefore, the fluid moves vertically upward until it equalizes with the force of gravity. This minimizes the amount of priming that must occur before pumping operations because the effects of atmospheric pressure is lessened and there is less vertical distance to lift the water.

In addition, another embodiment of the present invention comprises a valve mounted within the inner chamber of the siphon assembly adjacent to the second end of the inner chamber. The valve is closed initially when the pressurized fluid source adds fluid to the hydrant pipe, the valve prevents that fluid from rapidly leaking into the body of water by flowing in the second direction. This fluid replaces the air within the hydrant pipe which facilitates priming and prevents primer burnout before flow can be established. The valve is opened concurrently with the start of the priming or pumping operation.

In the presently preferred embodiment, the valve is a check valve. The check valve includes a check valve housing which can be comprised of a valve support plate formed with a plurality openings to permit fluid flow therethrough from the water body in response to the demand pressure and a valve seal. The valve seal can be mounted to the valve support plate on a side facing the first end of the housing of the siphon assembly. The valve seal can be arranged to at least substantially entirely cover the plurality openings under the action of reverse flow of fluid entering the pipe from the unsubmerged end and be deflected into an open position in response to the demand pressure so as to permit fluid from the body of water to flow of water through the openings of the valve support plate. That is, the valve seal is flexible and connected to the valve support plate so as to be bendable away from the plate in response to the fluid flow from the water body (to open the valve), and to be pressed flat against the plate in response to the reverse fluid flow (to close the valve) to initially fill the pipe. Installation of this check valve allows water pumped into the dry pipe, such as from a tank onboard a pumper truck, to be held within the pipe at least for a short time period sufficient so to enable a primer pump to establish proper flow so that a larger (e.g., centrifugal) fire pump can flow water from the pipe at draft.

The valve support plate has a periphery shaped to correspond to the shape of the inside surface of the inner chamber of the siphon assembly to which it is connected. The valve seal and the valve plate are preferably circular in configuration and a hinge bar can be used to connect the valve seal to the plate. In the preferred embodiment, the hinge bar can extend along the diameter of the valve seal to define a pair of valve seal flaps which open and close along the hinge line established by the hinge bar.

The valve support plate can also be formed with a band of thin slots which are located radially outward from the periphery of the valve seal and, therefore, remain continuously open, irrespective of the valve seal position. This allows for controlled leakage of fluid in the second direction so that the water remaining in the pipe after completion of pumping recedes to the level of the water body. Removal of this water prevents freezing within the hydrant pipe. It also hinders fouling within the hydrant pipe by aquatic life, which could significantly decrease the flow characteristics of the dry hydrant.

In accordance another unique feature of the invention, there is provided a bypass valve arrangement including a bypass passage having one end connected to the pipe upstream from the check valve and an opposite end located downstream from the check valve in communication with a strainer attached to the second end of the siphon assembly. A bypass valve is mounted within the bypass passage and is operable to open, under a predetermined reverse flow pressure, to permit back-flushing of the strainer while the check valve remains closed under this reverse flow pressure.

It is accordingly an object of the present invention to have a dry hydrant installation which may be filled with water that will allow for easy priming of fire department pumping equipment without the occurrence of primer pump motor burnout. This object is applicable to large vertical lifts. It also applies to a dry hydrant insallation which may have excessive dry pipe horizonal lengths which can be filled to avoid primer burnout. These horizonal distances could exceed 1,000 feet.

Another object of the present invention is to utilize smaller pipe since pressure is being applied at the source end to aid in drafting. Reduction in pipe diameters could reduce installation expenses by sixty percent (60%).

Still another object is to increase the pressure and the velocity of the water exiting the pipe which will allow the centrifugal fire pump to be primed and to allow easily the flow of water at draft.

Other objects and advantages of the present invention will become readily apparent to those skilled in this art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

FIG. 6 is a front plan view of a check valve seal of the check valve housing;

FIG. 7 is a side view of the valve seal of FIG. 6;

FIG. 8 is a front plan view of a retainer hinge bar used to bolt the valve seal to the valve support plate;

DETAILED DESCRIPTION OF THE INVENTION

The present invention is more particularly descried in the following examples which are intended as illustrative only since numerous modifications and variations therein will be apparent to those skilled in the art.

As used in the specification and in the claims, "a" can mean one or more, depending upon the context in which it is used.

Figure 1A:
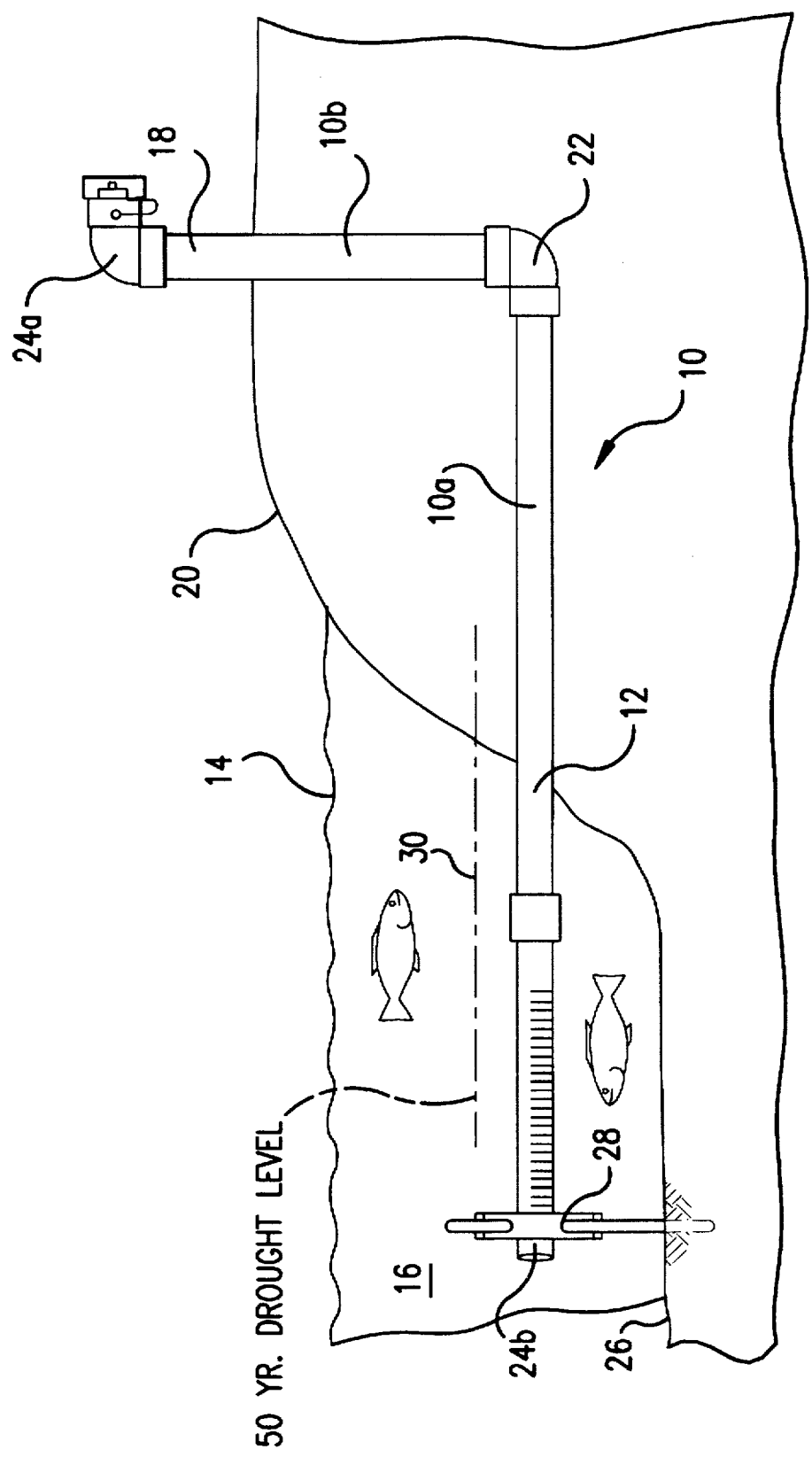
FIG. 1A is an elevational view, partially in schematic form, of a standard dry hydrant installation.
Figure 1B:
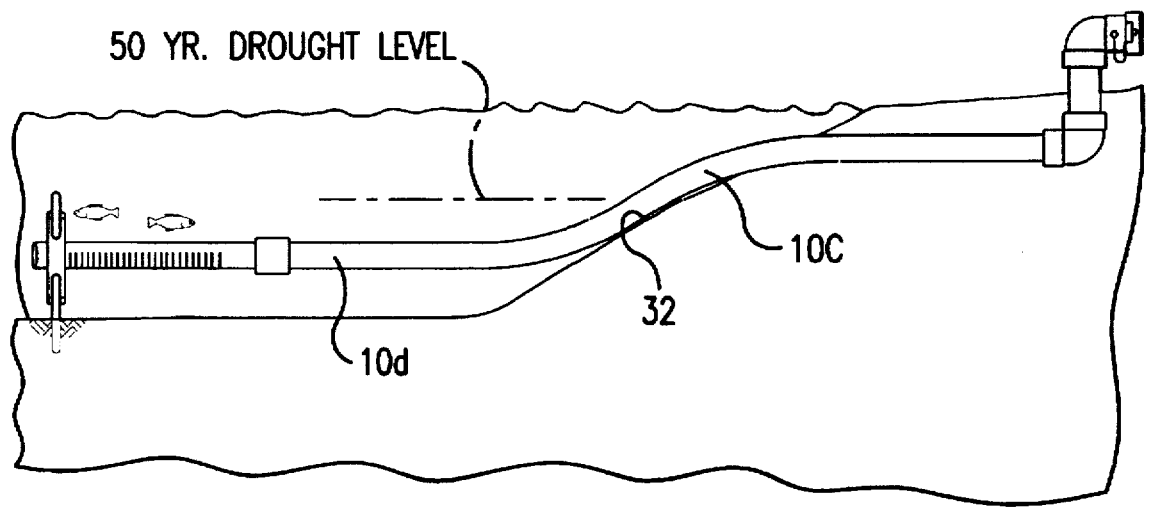
FIG. 1B is an elevational view, partially in schematic form, of a typical dry hydrant installation in a shallow pond.
Figure 1C:
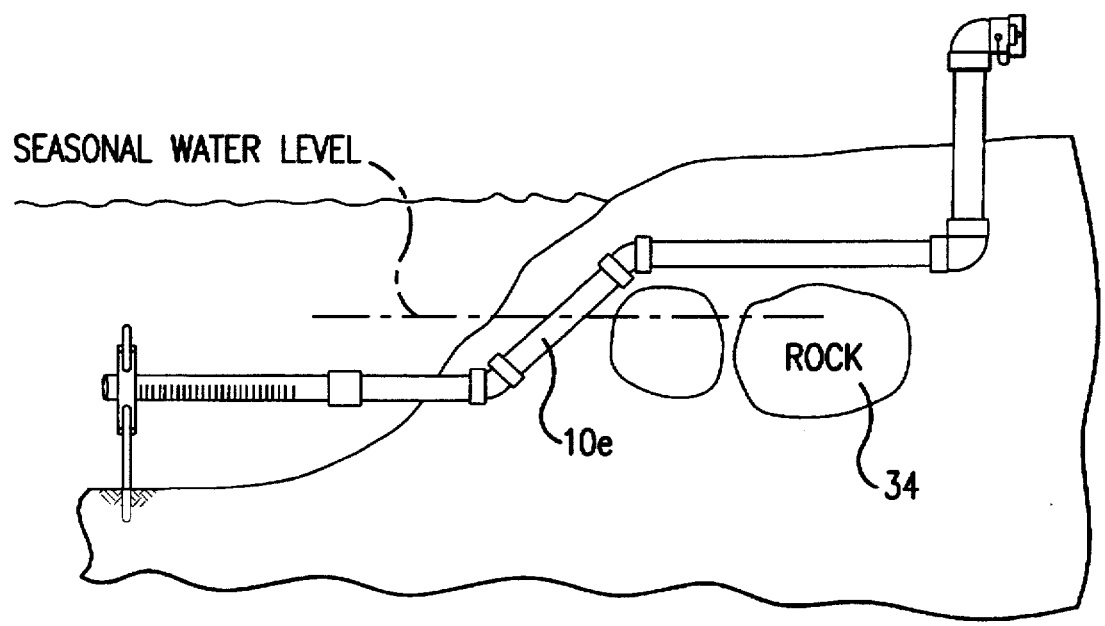
FIG. 1C is an elevational view, partially in schematic form, of a typical dry hydrant installation wherein underground obstructions are encountered.
Figure 2:
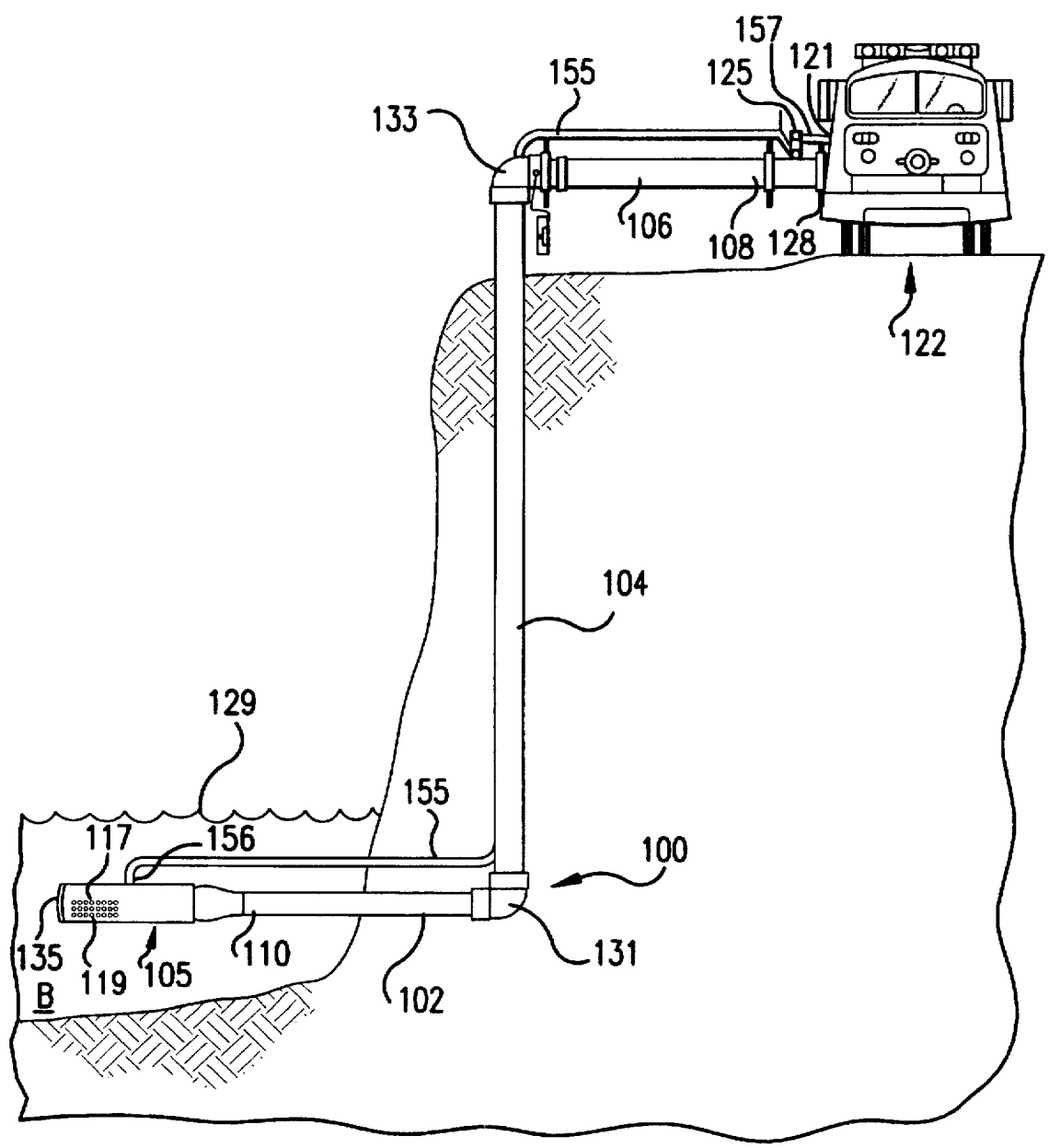
FIG. 2 is an elevational view, partially in schematic form, of a dry hydrant installation constructed in accordance with the present invention.

A dry hydrant installation 100, constructed in accordance with the principles of the present invention, is depicted in FIG. 2 and generally comprises a normally unpressurized hydrant pipe having one or more sections 102,104,106, described more fully below. The dry hydrant 100 defines an unsubmerged end 108 located adjacent and above a body of water B and a submerged end 110 located within the body of water B (preferably at a depth greater than the 50 year drought level). In accordance with the unique features described hereinbelow, a siphon assembly 105 can be connected to the submerged end 110 of the hydrant pipe 100.

Figure 3:
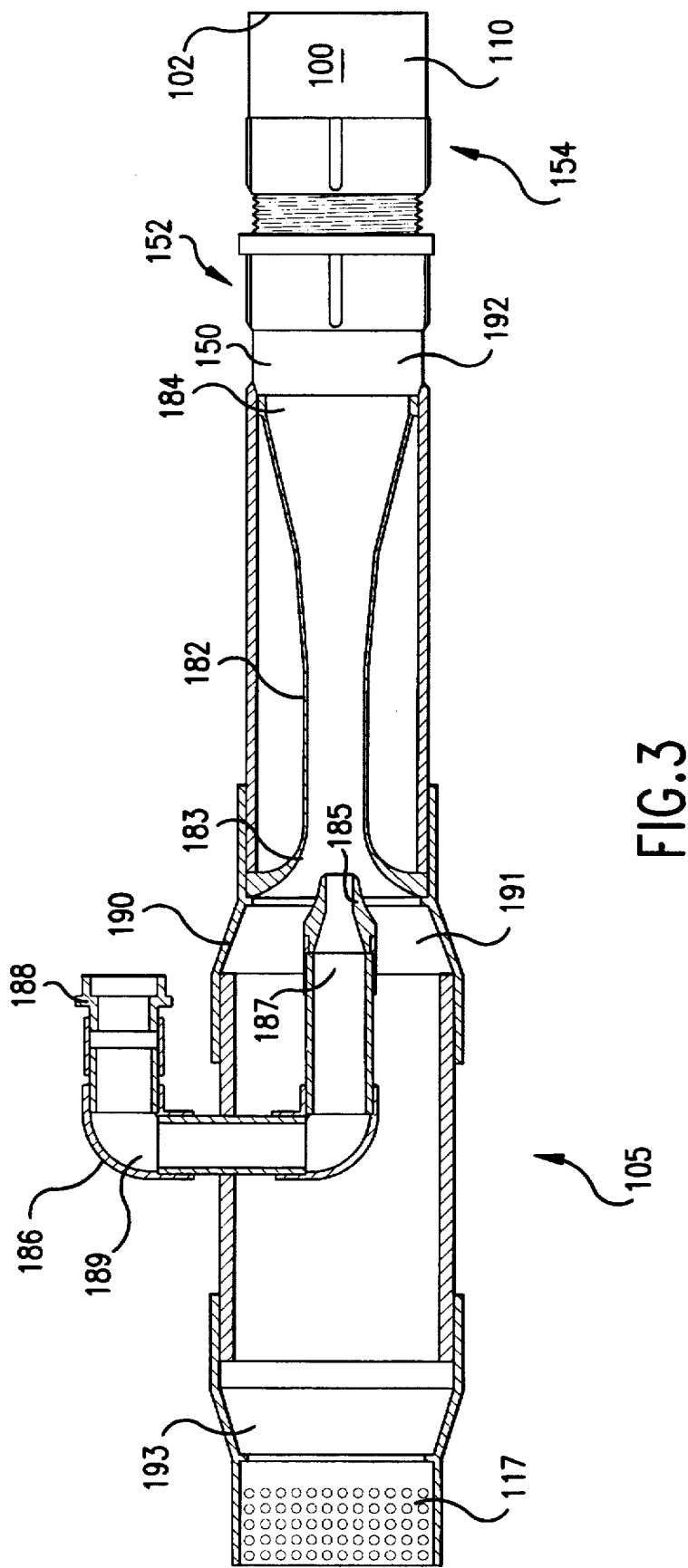
FIG. 3 is a side vertical cross-sectional view of a siphon assembly without a check valve in accordance with the present invention.

In the presently preferred embodiment, as best depicted in FIG. 3, the siphon assembly 105 comprises a housing 190 defining therein an inner chamber 191 having a first end 192 in fluid communication with the submerged end 110 of the hydrant pipe 102 and an opposite second end 193 in fluid communication with the body of water B. A nozzle jet 182 is mounted within the inner chamber 191 and has an upstream end 184 adjacent the first end 192 of the housing 190 and an opposite downstream end 183. Venturi tube 186 is also located in the housing and has a first venturi end 187 within the inner chamber 191 intermediate the second end 193 of the inner chamber 191 and the downstream end 183 of the nozzle jet 182, a second venturi end 188 disposed outside the housing 190, and a conduit 189 connecting the first venturi end 187 and the second venturi end 188 and allowing fluid communication therebetween.

The present invention also comprises a pressurized fluid source 121 (FIG. 2) in communication with the venturi tube 186 of the siphon assembly 105. Pressurized fluid enters the second venturi end 188 of the venturi tube 186, travels through the conduit 189, and exits the first venturi end 187. The pressurized fluid then enters the downstream end 183 of the nozzle jet 182 and exits the upstream end 184. The siphon assembly 105 thus forces water in a first direction through the hydrant pipe assembly 100 and out of the unsubmerged end 108. The siphon assembly 105 impedes the flow of fluid through the hydrant pipe assembly 100 in an opposite second direction.

Figure 4:
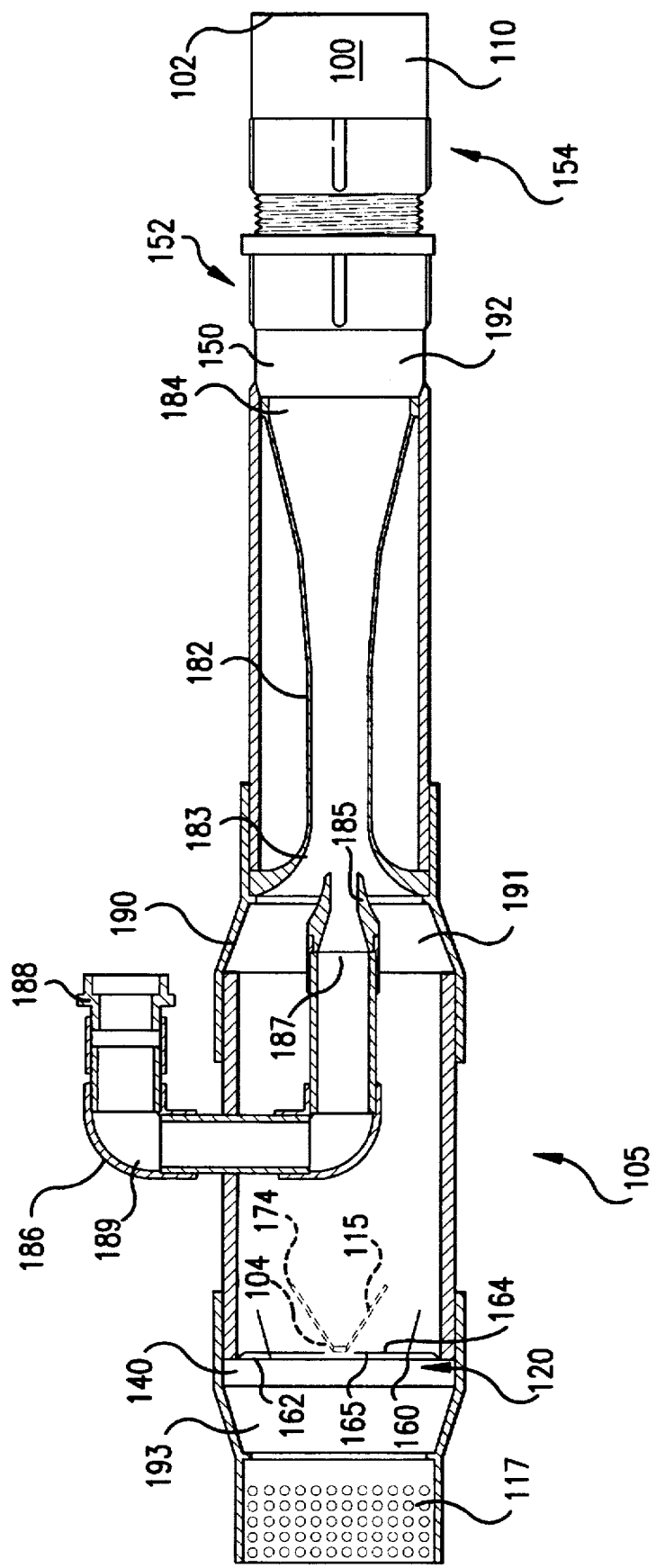
FIG. 4 is a side vertical cross-sectional view of a siphon assembly having a check valve in accordance with the present invention.

As shown in FIGS. 3 and 4, the first venturi end 187 of the venturi tube 186 comprises a conical tapered nozzle 185 which increases the flow velocity of the pressurized fluid exiting therefrom. The nozzle jet 182 is a convergent-divergent nozzle in which the pressurized fluid exiting the first venturi end 187 of the venturi tube 186 enters the downstream end 183 of the nozzle jet 182 and also entrains water from the body of water B. The combination of the pressurized fluid and the water from the body B flows through the nozzle jet 182 and exits its upstream end 184. This causes two effects: (1) it creates a higher pressure at the upstream end 184 to force water in the first direction and (2) creates a lower pressure at the downstream end 183 of the nozzle jet 182 to assist in entraining water from the body of water B to flow through the nozzle jet. Upon exiting the nozzle jet, the pressure of the combination of the fluids has increased and therefore the fluid moves vertically upward until the pressure equalizes with the force of gravity. This minimizes the amount of priming that must occur before pumping operations because atmospheric pressure has less effect and there is less vertical distance through which the priming pump must draw water.

The first end 192 of the housing 190 of the siphon assembly 105 can be attached to the submerged end 110 of the hydrant pipe 100 using a variety of different attachment methods. For instance, the attachment includes a male coupling 152 adapted to be received within a female coupling 154 fixed to the submerged end 110 of the hydrant pipe to facilitate rapid installation, repair, or replacement of the siphon assembly 105 or its strainer 117.

Referring again to FIG. 2, the dry hydrant pipe 100 between the unsubmerged and submerged ends 108,110 thereof may be formed from polyvinyl chloride (PVC) pipe of sufficient diameter (e.g., six inches), wherein the plural pipe sections 102,104,106 are interconnected as necessary through a series of 45° and 90° elbow sections 131,133 to locate the strainer 117 at a proper depth beneath the surface 129 of the water body B.

As shown in FIG. 4, the siphon assembly 105 can include a valve 104 which may be any type known in the art. For example, the valve 104 may be a gate valve operable by a reach rod (not shown). With the valve 104 closed, the pressurized fluid source 121 could fill the dry hydrant 100 with fluid. Then, the valve 104 could be opened concurrent with a suction source, e.g., a fire truck pump 122, applying a negative pressure demand. Thus, the present invention would allow the dry hydrant 100 to operate beyond the atmospheric pressure limitations while avoiding motor burn-out.

The presently preferred valve 104 is a check valve 115. As best depicted in FIG. 4, a check valve assembly 120 is disposed within a check valve housing 140 (preferably made of PVC). The check valve housing 140 is attached to the second end 193 of the inner chamber 191 of the siphon assembly 105. The check valve 115 is thus disposed across the axis of flow of water through the housing 190 of the siphon assembly 105.

Figure 5:
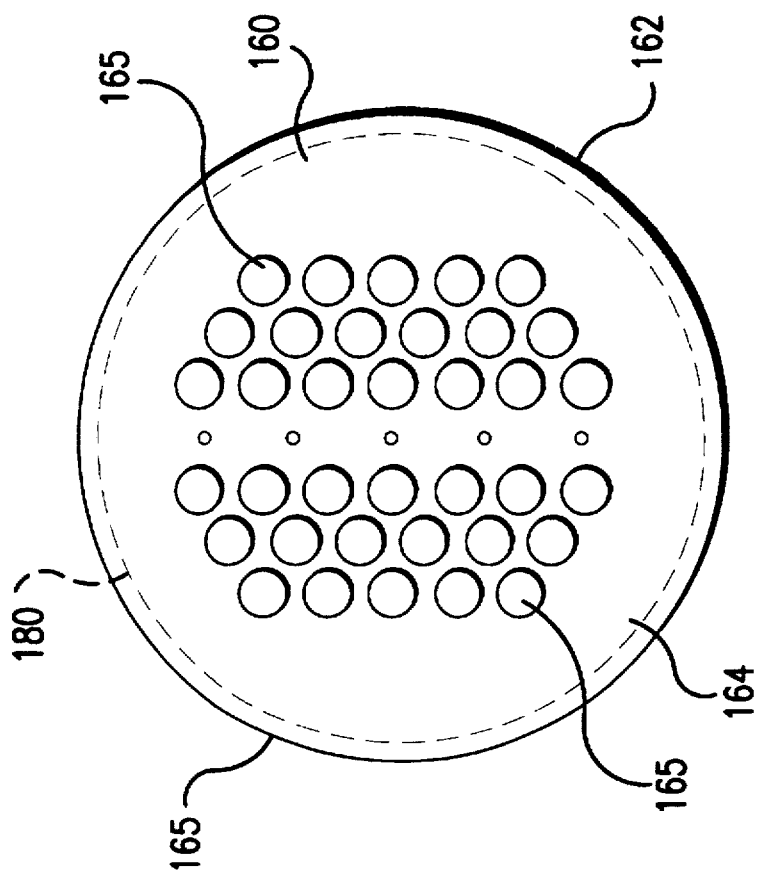
FIG. 5 is a front plan view of a check valve plate within the check valve assembly of FIG. 4.

Still with reference to FIG. 4 and as seen in more detail in FIGS. 5-8, the check valve housing 140 comprises a circular valve support plate 160 having a periphery 162 bonded or otherwise secured to the inner surface of the check valve housing 140. The valve support plate 160 has a first side 164 facing the first end 192 of the housing 190 of the siphon assembly 105 and an opposite second side 165. As best depicted in FIG. 5, the valve support plate 160 is formed with a plurality of openings 166 therethrough to permit water to flow from the body of water B into the inner chamber 191. The openings 166 are designed to be large enough to admit a free flow of water into the hydrant pipe assembly 100 when the negative demand pressure is applied to the hydrant pipe. In the preferred embodiment, the valve support plate 160 is made from a molded ABS material.

A valve seal 174 is mounted on the first side 164 of the valve support plate 165 and is movable by the flow of fluid through the siphon assembly 105 between an open position which allows fluid flow in the first direction and a closed position, wherein the valve seal 174 substantially entirely covers the plurality of openings 166 in the valve support plate 160 to impede flow of fluid in the second direction. As best depicted in FIGS. 6 and 7, the flexible check valve seal 174 is also of circular configuration in plan view and has a diameter adapted to cover the concentric arrays of openings 166 formed in the valve support plate 160 when the check valve is in the closed position which is caused by the pressure of fluid entering the siphon assembly 105 from the pressurized fluid source 121 during initial filling. In this manner, this self-closing action of the flexible valve seal 174 against the valve support plate 160 serves to retain the fluid from the pressurized fluid source 121 within the pipe 100 for fast and reliable filling.

The valve seal 174 comprises two equal deminsioned sections 174b,174c, each having a proximal side 174d and a hinge member 176 (FIG. 8) on the first side 164 of the valve plate 166. Each of the sections 174b,174c are connected to the hinge member 176 along the respective proximal side 174d in opposed relationship to each other so as to be movable between the open and closed positions. FIG. 4, however, shows the check valve 115 in phantom lines opening 90° from the actual position in the preferred embodiment for illustration purposes. In actuality, the preferred embodiment has the proximal sides 174d of the two equal deminsioned sections 174b,174c and the hinge member 176 aligned with the vertical axis so that gravity does not adversely affect its operation.

FIG. 8 is an illustration of the retainer hinge member 176 which is formed of square stock and defines a hinge axis 4 that divides the valve seal 174 into a pair of symmetrical valve flaps 174b,174c, each opening and closing about the hinge axis in response to positive filling pressures (closing the valve), or negative demand pressures (automatically opening the valve).

Preferably, the check valve 115 of the present invention is designed so that head loss does not exceed 1.0 psi at a flow rate of about 1,000 gallons per minute. The weep openings 180 should allow receding of the filled pipe at a flow rate of approximately 0.33 gallons per minute but no more than one gallon per minute. The check valve 115 should also hold a head pressure of 15 feet, or 6.45 pounds per square inch.

The valve seal 174 can be designed so as to not cover all flow paths for water past the valve plate 160. With reference again to FIG. 5, it can also be seen that the valve plate 160 can further be formed with a series of elongated circumferentially spaced openings 180 which are radially outwardly spaced from the periphery 174a of the flexible valve seal 174 when it is in the flat, closed position. These outer openings 180 in the valve support plate 160 function as weep holes which serve to automatically drain the hydrant pipe 100 upon completion of pumping water for fire suppression demands to advantageously prevent freezing of the dry hydrant pipe 100. It will be appreciated that these weep openings 180 have a small area for fluid flow and thus are designed to result in controlled leakage of the check valve housing 140 without seriously affecting the ability of the siphon assembly 105 to retain water within the pipe 100 for a sufficient time period. This allows for rapid filling at the onset of fire suppression pumping demands.

The check valve housing 140, therefore, is operable to prevent reverse fluid flow from the hydrant pipe 100 into the body of water B and to advantageously allow the pipe to be filled with fluid from a pressurized fluid source 121.

The pressurized fluid source 121 can be any fluid that allows the siphon assembly 105 to function. The fluid preferably is water supplied from a pump truck 122 (FIG. 2). The pressurized water should not be pressurized to more than 25 pounds per square inch. As the water is injected into the housing 190 of the siphon assembly 105, the normal closing action of the check valve 115 allows air within the hydrant pipe 100 to be replaced with water from the pumper truck 122. Air escapes from the hydrant pipe 100, preferably through a vent valve 125, during the filling process. Pumping can thus begin without any priming if the entire hydrant pipe 100 is filled with water. If is required, it can be for an extremely brief interval since all of the dry hydrant system pipes 102,104,106 are now filled through the siphon assembly 105 from the water carried onboard the fire truck 122. Thus, the priming pump can operate prior to the entire hydrant pipe 100 being completely filled without motor burnout.

Preferably, the pressurized fluid source can be rapidly connected to the siphon assembly 105. Accordingly, a connector 155 having a lower end 156 connected to the second venturi end 188 of the venturi tube 186 and an opposite upper end 157 adjacent the unsubmerged end 108 of the hydrant pipe 100 is not removed after pumping operations. Thus, a pump truck 122 may rapidly begin supplying water into the dry hydrant 100 via the siphon assembly 105 to reduce the time to commence pumping from the body of water B.

The amount of water carried onboard a tank onboard the pumper truck 122 will determine the overall length of pipe sections 102,104,106 which can be filled. Preferably, a 2:1 safety margin is used to assure that an adequate onboard water supply is available to fill the empty pipe. However, for certain installations and primer pump equipment, it will be understood that the hydrant assembly 100 need not necessarily be completely filled for the invention to have utility, so long as sufficient water is added into the pipe to prevent primer pump motor burnout.

As the pumping continues, the siphon assembly 105 can continue to operate. Pumping can continue with or without the pressurized fluid source 121 operating. If the pressurized fluid source is operated, the discharge rate of flow will equal approximately 2.3 times the flow being directed down to the jet siphon 105. Either way of operating will result in the valve seal 174 maintaining itself in the open position as the water from the body B flows through the siphon assembly 105. Likewise, the pump speed can be increased to raise flow rate.

A strainer 117 is mounted on the second end 193 of the housing 190 of the siphon assembly 105 so that the strainer 117 is in fluid communication with both the siphon assembly 105 and the body of water B. The strainer 117 operates to filter particulate matter from entering the siphon assembly 105 and the hydrant pipe 110. The strainer 117 can be of several types, such as a low level type which allows intake of water from shallow sources—less than 1 foot in depth. This type of strainer 117 can be designed for bridge applications or shallow swift stream applications usually found in mountainous regions. Second, a more common type exists known as a horizontal strainer which is used when there is a sufficient amount of water in the body B and the pipe is entering the source B in a horizontal plane. Strainer holes for the horizonal strainer type are drilled in a 180° pattern which usually runs the entire length of the strainer. The third type of strainer is referred to as a barrel strainer which is used with a pipe that enters vertically and has holes 360° around the surface.

As shown in FIG. 2, the strainer 117 generally consists of a section of PVC pipe having the plural openings 119 formed along its length. Preferably, the length of the strainer 117 is in the range of four to eight times the diameter of the pipe 100 forming the strainer 117. The open end of the strainer 117 nay be covered with a cap 135. The open end should be a predetermined distance from the water bottom to prevent the intake of debris, fish or the like into the hydrant pipe 100 through the siphon assembly 105. The open end can be supported via an upright support (not shown). The strainer openings 119 are designed to be large enough to admit a free flow of water when the strainer 117 is disposed in the water body B and suction pressure is supplied to the hydrant pipe 100 via the fire hose service coupling 125 by fire service pumper or tanker 122.

Figures 9A, 9B:
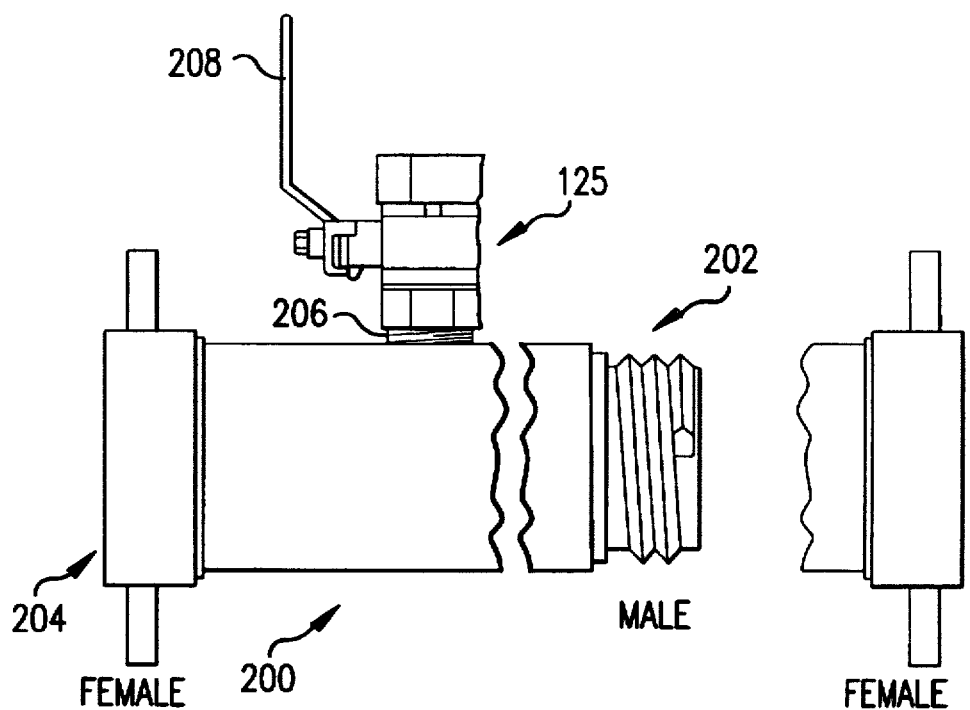
FIG. 9 is a side view, partly in schematic form, of a coupling adapter and a vent valve assembly.

To accelerate the filling of the dry hydrant pipe in a rapid manner, the present invention provides for a vent valve assembly 125 which is positioned to vent air within the pipe to the atmosphere as the air is displaced by the fill water. Referring now to FIGS. 2 and 9, the vent valve 125 is preferably located at the highest point in the strainer side wall in open communication with the strainer interior on the opening side of the check valve. The vent valve 125 is preferably attached to a coupling adapter 200 formed respectively with male connector 202 and female connector 204 at opposite ends thereof which are adapted to be connected to the suction hose 127 of the pump truck 122 and the unsubmerged end 108 of the dry hydrant pipe 110, respectively. Preferably, the vent valve 125 is threadedly connected to a fitting 206 extending upwardly from the coupling pipe 200 and in open communication therewith. The vent valve 125 may be a quarter turn ball valve as well known in the art wherein the valve lever 208 is movable between an opened and a closed position.

Initially, prior to filling, the vent valve 125 is switched to the open position to communicate the air within the dry hydrant pipe interior to atmosphere. Thereby, as the hydrant pipe 100 is filled, air inside the pipe can escape through the vent valve 125. Once water flows out of the opened vent valve 125, the vent valve 125 is closed. Simultaneously, the operator opens the gated suction of pump apparatus.

It should be understood that the check valve 115 is capable of operation without a vent valve 125. However, since the air in the hydrant pipe 100 must be allowed to escape during the filling process, this can otherwise be accomplished by loosening the connection between the suction hose 127 with the pump intake which would slow the filling process. It would nevertheless result in an operable system.

Upon completion of fire suppression demands, the pump may be shut down and a suction hose 127 is removed from the dry hydrant vent coupling adapter 125. As discussed above, the valve plate 160 of the check valve housing 140 is preferably designed to provide for a slow leakage which enables the remaining water in the dry hydrant 100 to recede to the surface level 129 of the water body B, thus preventing freezing of the hydrant pipe above the freeze zone.

Inspection of dry hydrants must be performed periodically (e.g., every six months) to obtain maximum ISO credit. This inspection usually consists of flow testing and back flushing The purpose of the inspection is to ensure that the strainer 117 is clean and ready to use in an emergency. To enable back flushing, the siphon assembly 105 and strainer 117, shown in FIGS. 3 and 4, can be designed with the male and female coupling connectors 152,154 which allows for underwater removal. Once removed, the siphon assembly 105 and strainer 117 can be inspected, cleaned and replaced if necessary.

Figure 10:
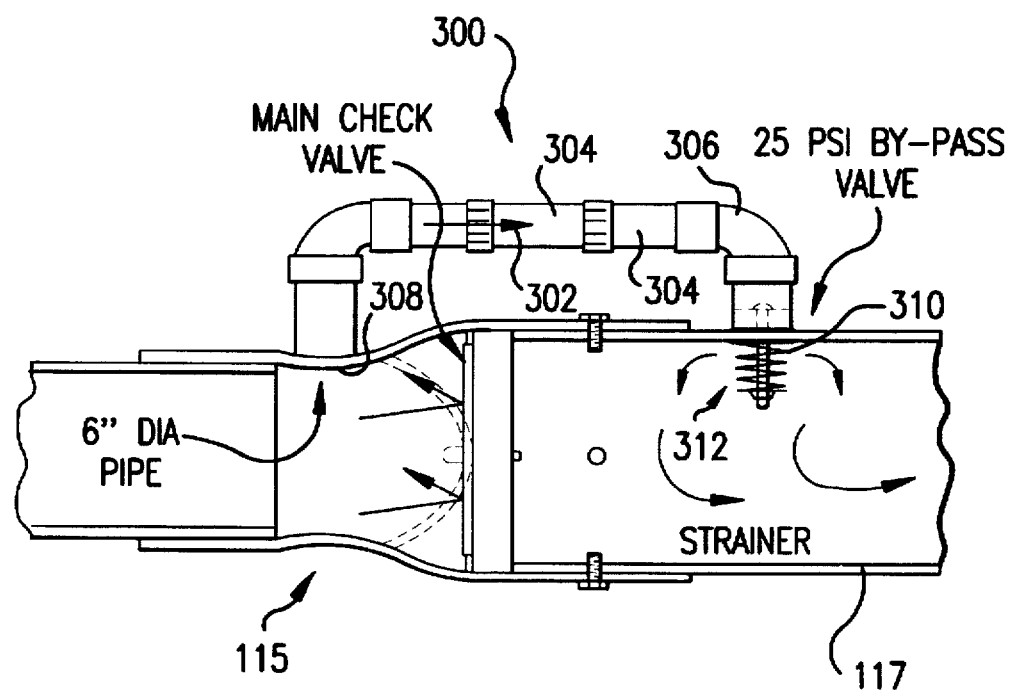
FIG. 10 is a partial vertical sectional view of a bypass valve arrangement.

In accordance with another embodiment of the present invention, a back flushing assembly 300 as depicted in FIG. 10 may be utilized to allow for periodic back flushing of the strainer 117 without removing either the siphon assembly 105 or the strainer 117. The back flushing assembly 300 comprises a bypass valve duct 302 formed from a series of piping sections 304 and elbow connectors 306 having an effluent bypass end 310 in communication with the strainer 117 and an opposite influent bypass end 308 in fluid communication with the hydrant pipe 100 and on the opposite side of the check valve 115 as the effluent bypass end 310. A bypass valve 312 is mounted within the bypass valve duct 302 and is operable between a shut position and a flow position which results from a predetermined pressure in the second direction and allows back flushing of the strainer 117 while circumventing the check valve 115. Back flushing the strainer 117 is achieved by a smaller, high pressure bypass valve 312 which may be disposed in the reverse direction of the check valve 115. Preferably, the bypass valve 312 is operable to open under a predetermined reverse flow pressure to permit back flushing of the strainer 117 which the check valve 115 remains closed. The predetermined reverseflow pressure preferably is approximately 25 pounds per square inch. The weep holes 180 are of sufficiently small diameter so as to not hinder this action. The normal pressure which results from filling the hydrant pipe 100 supplied by fluid from the pressurized fluid source 121 is less than the opening pressure of the bypass valve 312 so that the back flushing assembly 300 does not inadvertently leak water into the strainer 117 during the filling process.

Referring to the Figures discussed above, the present invention also provides a method of drawing water from a body of water B into a receptacle (e.g., pumper truck 122) through a dry hydrant 100. The dry-hydrant 100 comprises a hydrant pipe 102,104,106 having a submerged end located within the body of water and an unsubmerged end 108 located elevationally above the body B, a siphon assembly 105 comprising a housing 190 defining therein an inner chamber 191 having a first end 192 in fluid communication with submerged end 110 of the hydrant pipe 102 and an opposite second end 193 in fluid communication with the body of water B. A nozzle jet 182 is mounted within the inner chamber 191 and has an upstream end 184 adjacent the first end 192 of the housing 190 and an opposite downstream end 183. A venturi tube 186 is provided and has a first venturi end 187 located within the inner chamber 191 intermediate the second end 193 of the inner chamber 191 and the downstream end 183 of the nozzle jet 182, a second venturi end 188 disposed outside the housing 190, and a conduit 189 connecting the first venturi end 187 and the second venturi end 188 and allowing fluid communication therebetween and a pressurized fluid source 121 in communication with the venturi tube 186 of the siphon assembly 105.

The method involves directing the pressurized fluid into the second venturi end 188 of the venturi tube 186 whereby the pressurized fluid exits the first venturi end 187 and then enters the nozzle jet 182 to force the fluid in a first direction through the pipe 100 and toward the unsubmerged end and impedes flow in the opposite second direction. The method then entails applying a suction pressure to the hydrant pipe 100 proximate the unsubmerged end 108 to begin drawing into a receptacle a combination of the fluid from the pressurized fluid source 121 and water from the body B through the hydrant pipe 100.

The method can alternatively further comprise a valve 104 mounted within the inner chamber 191 adjacent the second end 193 of the housing 190 of the siphon assembly 105, whereby the method comprises the further step of adding fluid to the hydrant pipe 100 through the pressurized fluid source 121. The valve 104 impedes flow in the second direction. Furthermore, the method can additionally include the further step of venting air from the hydrant pipe 100 as the hydrant pipe 100 is filled with fluid.

Figure 11:
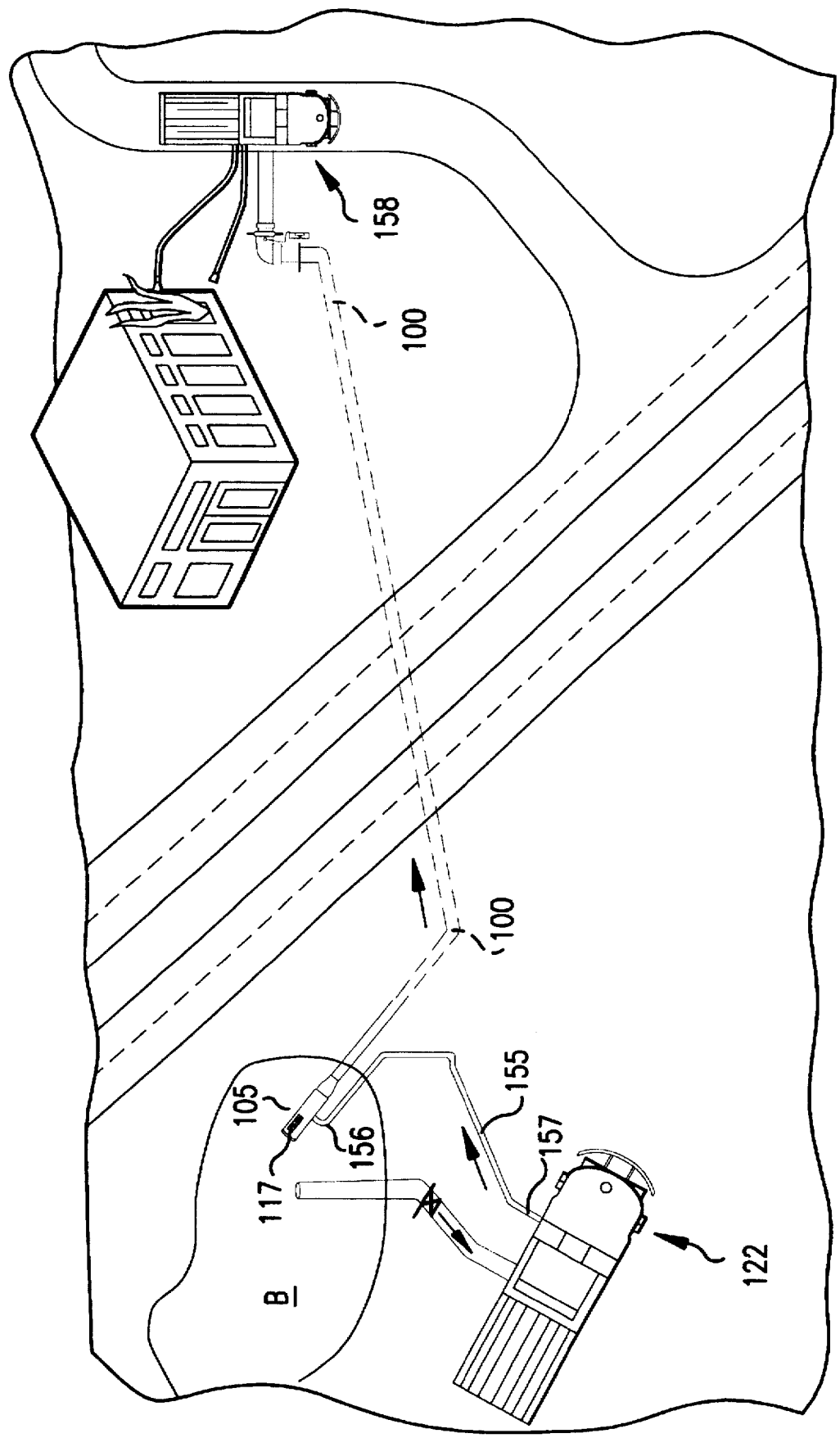
FIG. 11 is a schematic representation of two trucks utilizing the present invention in conjunction with each other.

Additionally, as illustrated in FIG. 11, the pressurized fluid in the above method can be water provided by a pumper truck 122. The receptacle can be a pumper truck 122. As shown in FIG. 11, the pressurized fluid can be provided by a supply pumper truck 122 and the demand pressure can be provided by a separate attack pumper truck 158. The supply pumper truck 122 is preferably located adjacent the body of water B and the supply pumper truck 122 and the attack pumper truck 158 can be separated by a distance up to approximately 1 mile or more.

The present invention also provides a method of constructing a siphon assembly 105 on a hydrant pipe 100 which has a submerged end 110 to be located within a body of water B and an unsubmerged end 108 to be located elevationally above the body of water B. The method includes mounting a siphon assembly 105 on the submerged end 110 of the hydrant pipe 100 and in fluid communication therewith. The siphon assembly 105 comprises a housing 190 defining therein an inner chamber 191 having a first end 192 in fluid communication with the submerged end 110 of the hydrant pipe100 and an opposite second end 193 in fluid communication with the body of water B, a nozzle jet 182 mounted within the inner chamber 191 and having an upstream end 184 adjacent the first end 192 of the housing 190 and an opposite downstream end 183. A venturi tube 186 having a first venturi end 187 located within the inner chamber 191 intermediate the second end 193 and the downstream end 183 of the nozzle jet 182, a second venturi end 188 disposed outside the housing 190, and a conduit 189 connecting the first venturi end 187 and the second venturi end 188 and allowing fluid communication therebetween. The method entails connecting the second venturi end 188 to a pressurized fluid source 121, whereby the pressurized fluid enters the second venturi end 188 of the venturi tube 186, exits the first venturi end 187, then enters the nozzle jet 182 to force water in a first direction through the hydrant pipe 100 toward the unsubmerged end 108 and impedes the flow of water through the hydrant pipe 100 in an opposite second direction. This method can comprise the further step of mounting a valve 104 within the inner chamber 191 adjacent the second end 193 of the housing 190 of the siphon assembly 105.

The features of the siphon assembly 105 as described hereinabove advantageously either avoids the need for priming the dry hydrant pump if the pipe 100 is filled through the pressurized fluid source 121, or minimizes the amount of work of the primer pump so as to avoid motor burnout. The addition of the valve 104 also allows the use of installations wherein excessive dry pipe vertical runs which would otherwise cause primer burnout can now be utilized.

Although the present process has been described with reference to specific details of certain embodiments thereof it is not intended that such details should be regarded as limitations upon the scope of the invention except as and to the extent that they are included in the accompanying claims.

What is claimed is:

1. An above-ground dry hydrant in fluid communication with an open body of water, comprising:
   (a) a hydrant pipe having a submerged end located within said open body of water and an unsubmerged end located elevationally above the body of water, said submerged end being disposed substantially horizontally, and said unsubmerged end including attachment means for connecting to a pump contained on a fire truck;
   (b) a siphon assembly comprising a housing defining therein an inner chamber having a first end in fluid communication with the submerged end of the hydrant pipe and an opposite second end in fluid communication with the body of water, a nozzle jet mounted within the inner chamber and having an upstream end adjacent the first end of the housing and an opposite downstream end, and a venturi tube having a first venturi end located within the inner chamber intermediate the second end of the inner chamber and the downstream end of the nozzle jet, a second venturi end disposed outside the housing, and a conduit connecting the first venturi end and the second venturi end and allowing fluid communication therebetween, said housing being submerged and oriented along said horizontally disposed portion of said hydrant pipe; and
   (c) a pressurized fluid source in communication with the venturi tube of the siphon assembly wherein the pressurized fluid enters the second venturi end of the venturi tube, exits the first venturi end, and then enters the downstream end of the nozzle jet,
   whereby the siphon assembly is operable to force water in a first direction through the hydrant pipe and out of the unsubmerged end and impede the flow of water through the hydrant pipe in an opposite second direction.

2. The dry hydrant of claim 1, further comprising a valve mounted within the inner chamber of the siphon assembly adjacent the second end of the housing.

3. The dry hydrant of claim 2, wherein the valve is a check valve.

4. The dry hydrant of claim 3, wherein the check valve includes a check valve housing attached to the second end of the inner chamber of the siphon assembly, whereby the check valve is disposed across the axis of flow of water through the housing.

5. The dry hydrant of claim 4, wherein the check valve housing comprises:
   a.) a valve support plate having a first side facing the first end of the housing of the siphon assembly and an opposite second side, the valve support plate being formed with a plurality of openings therethrough to permit water to flow from the body of water into the inner chamber; and
   b.) a valve seal mounted on the first side of the valve support plate, the valve seal being movable by the flow of fluid through the siphon assembly between an open position which allows fluid flow in the first direction and a closed position, wherein the valve seal substantially entirely covers the plurality of openings in the valve support plate to impede flow of fluid in the second direction and when in the open position.

6. The dry hydrant of claim 5, wherein the valve seal comprises two equal deminsioned sections, each having a proximal side, a hinge member on the first side of the valve plate, each of the sections being connected to the hinge member on along the respective proximal side in opposed relationship to each other so as to be movable between the open and closed positions.

7. The dry hydrant of claim 3, wherein the check valve includes weep holes to allow controlled leakage in the second direction.

8. The dry hydrant of claim 1, further comprising a strainer mounted on the second end of the housing of the siphon assembly, wherein the strainer is in fluid communication with both the siphon assembly and the body of water and filters particulate matter from entering the hydrant pipe.

9. The dry hydrant of claim 1, wherein the pressurized fluid source is a pressurized source of water.

10. The dry hydrant of claim 9, wherein the pressurized fluid source of water is at a pressure of not more than 25 pounds per square inch.

11. The dry hydrant of claim 1, wherein the first venturi end of the venturi tube comprises a conical tapered nozzle which increases the flow velocity of the pressurized fluid exiting therefrom.

12. The dry hydrant of claim 1, wherein the nozzle jet further comprises a convergent-divergent nozzle, wherein the pressurized fluid exiting the first venturi end of the venturi tube enters the downstream end of the nozzle jet and also entrains water from the body of water, whereby the combination of the pressurized fluid and the water from the body flows through the nozzle jet and exits the upstream end of the nozzle jet which operates to create a higher pressure at the upstream end to force water in the first direction and to create a lower pressure at the downstream end of the nozzle jet to assist in entraining water to flow through the nozzle jet from the body of water.

13. The dry hydrant of claim 1, further comprising a vent valve assembly mounted to the pipe adjacent the unsubmerged end thereof.

14. The above-ground dry hydrant of claim 6 wherein said submerged portion of said hydrant pipe extends out horizontally, whereby a cross-section through said portion is in the vertical plane, and said hinge member is vertically oriented.

15. A method of drawing water from an open body of water into a receptacle through a dry hydrant, the dry hydrant comprising a hydrant pipe having a submerged end located within said open body of water and an unsubmerged end located elevationally above said open body of water, a siphon assembly comprising a housing defining therein an inner chamber having a first end in fluid communication with said submerged end of said hydrant pipe and an opposite second end in fluid communication with said open body of water, a nozzle jet mounted within said inner chamber and having an upstream end adjacent the first end of said housing and an opposite downstream end, and a venturi tube having a first venturi end located within said inner chamber intermediate the second end of said inner chamber and the downstream end of said nozzle jet, a second venturi end disposed outside the housing, and a conduit connecting the first venturi end and the second venturi end and allowing fluid communication therebetween and a pressurized fluid source in communication with the venturi tube of the siphon assembly, the inner chamber of the siphon assembly further comprising a valve, the method comprising the steps of:

(a) providing a horizontally disposed hydrant pipe beneath the surface of an open body of water;

(b) directing the pressurized fluid from the pressurized fluid source into the second venturi end of the venturi tube whereby the pressurized fluid exits the first venturi end and then enters the nozzle jet to force the fluid in a first direction through the pipe and toward the unsubmerged end and impedes flow in the opposite second direction;

(c) applying a suction pressure to said hydrant pipe proximate the unsubmerged end to begin drawing into a receptacle a combination of the fluid from the pressurized fluid source and water from the body through said hydrant pipe; and (d) adding fluid to the hydrant pipe through the pressurized fluid source by using a pumper truck, whereby the valve impedes flow in the second direction.

16. The method of claim 15, wherein the inner chamber of the siphon assembly further comprises a valve, the method comprising the further step of adding fluid to the hydrant pipe through the pressurized fluid source whereby the valve impedes flow in the second direction.

17. The method of claim 15, wherein the pressurized fluid is water provided by a pumper truck.

18. The method of claim 15, wherein the receptacle is a pumper truck.

19. The method of claim 15, comprising the further step of venting air from the hydrant pipe as the hydrant pipe is filled with water.

20. The method of claim 15, wherein the pressurized fluid is provided by a supply pumper truck and the suction pressure is provided by a separate attack pumper truck.

21. The method of claim 20, wherein the supply pumper truck is located adjacent the body of water and the supply pumper truck and the attack pumper truck are separated by a distance up to approximately 1 mile.

22. An above-ground dry hydrant in fluid communication with a body of water, comprising:

(a) a hydrant pipe having a submerged end located within the body of water and an unsubmerged end located elevationally above the body of water, (b) a siphon assembly comprising a housing defining therein an inner chamber having a first end in fluid communication with the submerged end of the hydrant pipe and an opposite second end in fluid communication with the body of water, a nozzle jet mounted within the inner chamber and having an upstream end adjacent the first end of the housing and an opposite downstream end, and a venturi tube having a first venturi end located within the inner chamber intermediate the second end of the inner chamber and the downstream end of the nozzle jet, a second venturi end disposed outside the housing, and a conduit connecting the first venturi end and the second venturi end and allowing fluid communication therebetween;

(c) a check valve mounted within the inner chamber of the siphon assembly adjacent the second end of the housing, said check valve including weep holes to allow controlled leakage in the second direction;

(d) a pressurized fluid source in communication with the venturi tube of the siphon assembly wherein the pressurized fluid enters the second venturi end of the venturi tube, exits the first venturi end, and then enters the downstream end of the nozzle jet, whereby the siphon assembly is operable to force water in a first direction through the hydrant pipe and out of the unsubmerged end and impede the flow of water through the hydrant pipe in an opposite second direction.

23. The above-ground dry hydrant of claim 22 wherein said weep holes are arcuate in shape, and where they are disposed around the outer periphery of said check valve.

24. An above-ground dry hydrant in fluid communication with an open body of water, comprising:
- (a) a hydrant pipe having a submerged end located within said open body of water and an unsubmerged end located elevationally above said open body of water,
- (b) a siphon assembly comprising a housing defining therein an inner chamber having a first end in fluid communication with the submerged end of the hydrant pipe and an opposite second end in fluid communication with said open body of water, a nozzle jet mounted within the inner chamber and having an upstream end adjacent the first end of the housing and an opposite downstream end, and a venturi tube having a first venturi end located within the inner chamber intermediate the second end of the inner chamber and the downstream end of the nozzle jet, a second venturi end disposed outside the housing, and a conduit connecting the first venturi end and the second venturi end and allowing fluid communication therebetween;
- (c) a check valve mounted within the inner chamber of the siphon assembly adjacent the second end of the housing;
- (d) a strainer mounted on the second end of the housing of the siphon assembly, the strainer being in fluid communication with both the siphon assembly and said open body of water and operable to filter particulate matter and prevent particulate matter from entering the pipe;
- (e) a bypass valve duct having an effluent bypass end in communication with the strainer and an opposite influent bypass end in fluid communication with the hydrant pipe and on the opposite side of the check valve as the effluent bypass end, and a bypass valve mounted within the bypass valve duct and operable between a shut position and a flow position which results from a predetermined pressure in the second direction and allows back flushing of the strainer while circumventing the check valve; and
- (f) a pressurized fluid source in communication with the venturi tube of the siphon assembly wherein the pressurized fluid enters the second venturi end of the venturi tube, exits the first venturi end, and then enters the downstream end of the nozzle jet, whereby the siphon assembly is operable to force water in a first direction through the hydrant pipe and out of the unsubmerged end and impede the flow of water through the hydrant pipe in an opposite second direction.

25. The dry hydrant of claim 24, wherein the predetermined reverse flow pressure is approximately 25 pounds per square inch.

* * * * *